Feb. 24, 1925.
K. W. BARTLETT
LIQUID TREATING APPARATUS
Filed Jan. 30, 1923
1,527,461
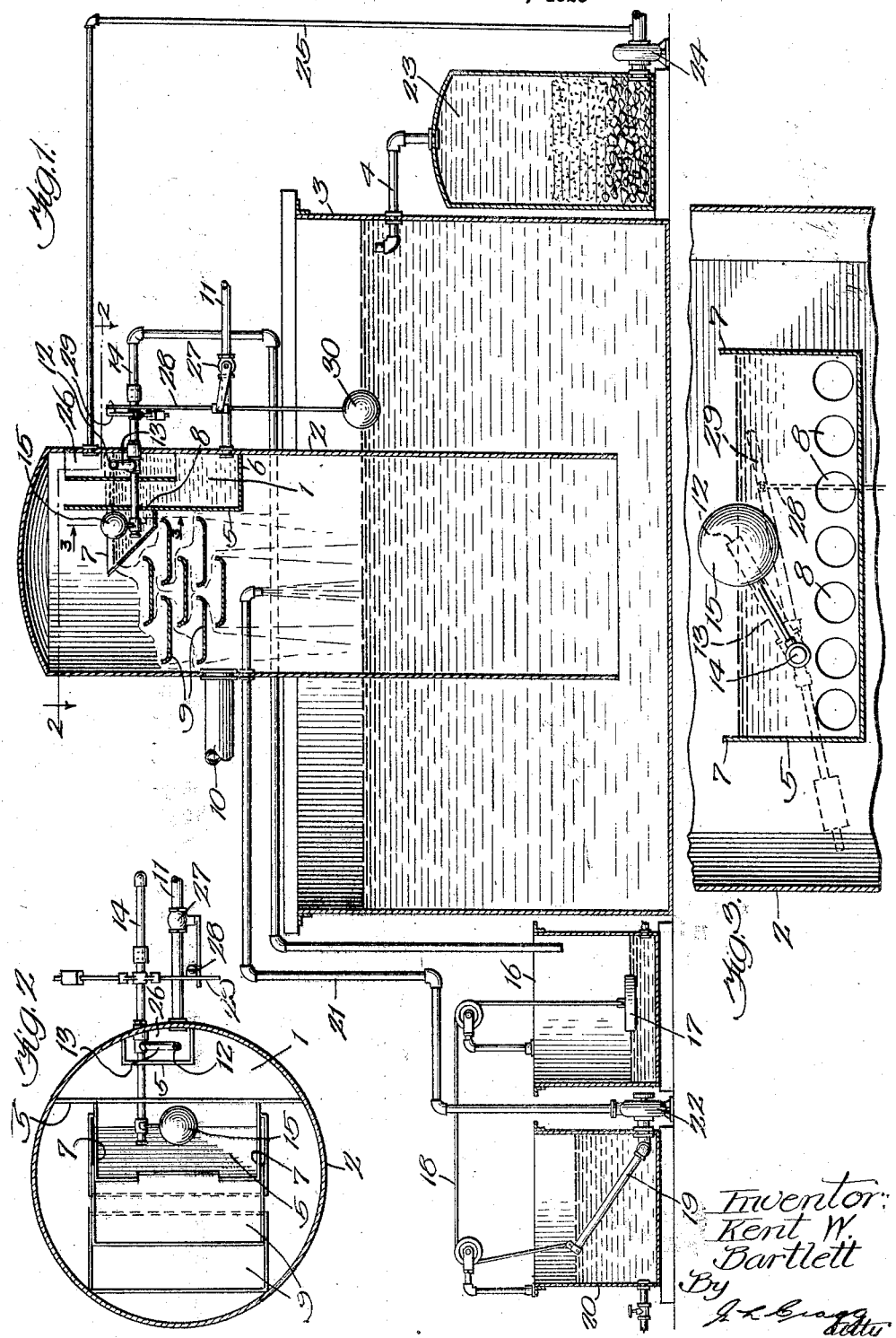

Patented Feb. 24, 1925.

1,527,461

UNITED STATES PATENT OFFICE.

KENT W. BARTLETT, OF HAMMOND, INDIANA.

LIQUID-TREATING APPARATUS.

Application filed January 30, 1923. Serial No. 615,836.

*To all whom it may concern:*

Be it known that I, KENT W. BARTLETT, a citizen of the United States, residing at Hammond, in the county of Lake and State of Indiana, have invented a certain new and useful Improvement in Liquid-Treating Apparatus, of which the following is a full, clear, concise, and exact description.

My invention relates to liquid treating apparatus employing a treatment tank, a chemical tank discharging into the treatment tank and mechanism subject to the liquid to be treated for regulating the flow of chemical from the chemical tank to make the chemical proportionate to the liquid to be treated.

The apparatus of my invention is of particular service when employed in connection with water softening equipment. In such equipment it has hitherto been proposed to subdivide the incoming raw water into a large stream and a small stream, the larger stream issuing through outlets of different size flowing into the treatment tank and the small stream operating upon mechanism to regulate the flow of chemical into the treatment tank.

In accordance with one plan these large and small outlets have been formed in the bottom of a container into which the water to be treated is discharged on its way for treatment and would satisfactorily function as long as raw water was received in the container to maintain a sufficient height above the container bottom. When the height was reduced to and below a certain point, however, the co-efficients of flow of the water through the outlets would become disproportionate since the volume of water flowing through the larger outlet would be reduced while the volume of water flowing through the smaller outlet would remain substantially unchanged. It was also proposed to place these large and small outlets in the side of the container but the relative flow would be varied due not only to the change in the height of the water in the container but also due to surface agitation of this water while in the container.

In practicing my present invention a riser is employed having outlets of different size, a container into which the larger outlet discharges and open at its upper portion to overflow, the larger outlet being below the limiting level of said container and the smaller outlet being at the discharge level of the container. There is a supply pipe for conveying liquid to be treated and discharging into the riser, a treatment tank into which said container discharges, a chemical tank discharging into the treatment tank, and mechanism for regulating the discharge of chemical from the chemical tank and governed by the liquid flowing from the smaller outlet.

In the preferred embodiment of the invention the smaller outlet is at the intake end of a discharge pipe which is positioned to receive liquid from the riser and is mounted to permit adjustment of this intake end to vary the level thereof. A float is disposed in the liquid that is supplied to the riser before this liquid is discharged in the treatment tank, this float being preferably located in the container and being connected with the discharge pipe to vary the level of the intake opening in the discharge pipe, according to the level of the liquid in the container.

A chamber also desirably surrounds the smaller outlet and the discharge pipe, if such be employed, for the purpose of preventing agitation of the liquid in the region of the smaller outlet or discharge pipe and also serving to locate a strata of softened water in the region of the smaller outlet if a small portion of the softened water is supplied to the chamber as is preferred. Thus the smaller outlet is prevented from being coated by the unsoftened water that is initially supplied to the riser. The results are further improved by warming the water, preferably before it is received in the treatment tank.

The invention will be more fully explained by reference to the accompanying drawing in which Fig. 1 is a view in elevation, and somewhat diagrammatic, illustrating the preferred embodiment of the invention; Fig. 2 is a sectional view on line 2—2 of Fig. 1 but on a larger scale; and Fig. 3 is a sectional view taken on line 3—3 of Fig. 1 but also on a larger scale.

Like parts are indicated by similar characters of reference throughout the different figures.

The water softening or liquid treating apparatus illustrated includes a riser 1 which is desirably formed within and includes a portion of the cylindrical wall of the larger chamber 2 projecting into the treatment tank 3, the major portions of the chemical reactions occurring in the chamber 2 to soften the water therein, the softened water flowing through the bottom of the chamber to the space surrounding the chamber 2 and being discharged from the treatment tank through the outlet pipe 4 to be used for the purpose for which the water is softened.

As illustrated, the riser 1 includes an upright wall 5 and a bottom wall 6, these two walls being located at the upper portion of the chamber 2 and co-operating with a portion of the cylindrical wall thereof to form the riser 1. I provide a container 7 for receiving raw water from the riser 1. The larger discharge outlet is provided in the upright wall 5 of the riser 1, this outlet being preferably formed of a group of openings 8. The container 7 overflows at its upper portion into the treatment tank by way of the chamber 2, the falling liquid desirably following zig-zag paths defined by the baffle plates or pans 9. Steam is admitted through the pipe 10 beneath these baffle plates to heat the falling liquid.

The water or other liquid to be treated is desirably initially admitted to the riser 1 at the bottom, though the invention is not to be limited to the location at which the water is admitted to the riser. I have illustrated a pipe 11 which terminates at the bottom of the riser where it discharges the water thereinto. The smaller outlet which supplies a small fraction of the water to operate the chemical control mechanism is desirably the intake opening 12 at the upper end of an inclined discharge pipe 13, located in the riser and constituting a valve, this pipe having a horizontal continuation 14 which issues through a side of the chamber 2 and is formed in articulated sections which permit the pipe 13 to swing in a vertical plane. The water holders 1 and 7 together constitute a receiver for the water. I provide a float 15 in the liquid that is in this receiver, this float being desirably disposed in the container 7. The outlet opening 12, in functioning, is at and preferably projects above the limiting or discharge level of the liquid in the container and is held in this relationship by the float 15 during the time that the liquid is flowing from the container into the treatment tank. The pipe 14 is continued downwardly to discharge into a float tank 16. A float 17 is within this tank and has its height governed by the level of the liquid therein, this liquid level rising as the water softening process continues, that is, as long as raw water is being supplied to the treatment tank. The float 17 is connected by means of a cable 18 with the swinging outlet pipe 19, that is disposed in the chemical tank 20. As the float rises the pipe 19 is lowered to cause the maintenance of flow of chemical through the pipe 21 to the treatment tank which is proportional to the water being supplied for treatment. A pump 22 may be employed to maintain the proper flow of chemical.

The softened water preferably passes through the filtering chamber 23 before being used for the intended purpose. The pump 24 promotes the flow of the softened and now filtered water to its destination. A small fraction of the softened and filtered water is supplied by the pipe 25 to the stilling chamber 26 located within the riser 1 and spaced apart therefrom, this stilling chamber being open at its ends to permit the flow of water from the riser thereinto. The pipe 25 desirably discharges into the stilling chamber near the functioning levels of the outlet 12 so as to provide a strata of softened quiet water in the region of this outlet. The pipe 25 is of such capacity as to supply water at a little faster rate than that at which it may flow through the opening 12 further to guard against the passage of hard water through this opening. The opening 12, being normally traversed only by softened water, is relieved of any chemical deposits, a result which is especially true if the water is heated.

To guard against the excessive flow of water through the riser 1 and the container 7 I provide a controlling valve 27 which is connected by means of a link 28 with an arm 29 that is upon the section of the piping 14 which carries the pipe 13. When there is an undue flow of liquid through the riser 1 the float 15 will operate the valve 27 to reduce the flow of liquid through the pipe 11.

The float 30 is desirably also employed, this float being immersed in the liquid in the treatment tank 3, this float being connected with the valve 27. When sufficient treated water has been accumulated in the treatment tank the float 30 will rise to close the valve 27.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Liquid treating apparatus including a riser having outlets of different size; a container into which the larger outlet discharges and open at its upper portion to overflow, the larger outlet being below the limiting level of said container and the smaller outlet being at the discharge level of the container; a supply pipe for conveying liquid to be treated and discharging into the riser; a treatment tank into which said container discharges; a chemical tank discharging into the treatment tank; and mechanism for regulating the discharge of chemical from the chemical tank and governed by the liquid flowing from the smaller outlet.

2. Liquid treating apparatus including a riser; a discharge pipe positioned to receive liquid from the riser and mounted to permit adjustment of the level occupied by one of its orifices; a container open at its top to overflow, the riser having an outlet discharging into the container which is larger than the intake opening of said discharge pipe; a float in the liquid that is in the container and connected with the discharge pipe to govern the level of the intake opening of the discharge pipe; a treatment tank into which the container discharges; a chemical tank discharging into the treatment tank; and mechanism for regulating the discharge of chemical from the chemical tank and governed by the liquid flowing through the discharge pipe.

3. Liquid treating apparatus including a riser; a discharge pipe positioned to receive liquid from the riser and mounted to permit adjustment of the level occupied by one of its orifices; a container open at its top to overflow, the riser having an outlet discharging into the container which is larger than the intake opening of said discharge pipe; a float disposed in the liquid before it overflows in the container and connected with the discharge pipe to govern the level of the intake opening of the discharge pipe; a treatment tank into which the container discharges; a chemical tank discharging into the treatment tank; and mechanism for regulating the discharge of chemical from the chemical tank and governed by the liquid flowing through the discharge pipe.

4. Liquid treating apparatus including a riser; a discharge pipe positioned to receive liquid from the riser and mounted to permit adjustment of the level occupied by one of its orifices; a container open at its top to overflow, the riser having an outlet discharging into the container which is larger than the intake opening of said discharge pipe; a float in the liquid that is in the container and connected with the discharge pipe to govern the level of the intake opening of the discharge pipe; a treatment tank into which the container discharges; a chemical tank discharging into the treatment tank; mechanism for regulating the discharge of chemical from the chemical tank and governed by the liquid flowing through the discharge pipe; and a valve controlling the supply of liquid to the riser and also connected with the aforesaid float to be closed thereby upon excessive flow of liquid.

5. Liquid treating apparatus including a riser; a discharge pipe positioned to receive liquid from the riser and mounted to permit adjustment of the level occupied by one of its orifices; a container open at its top to overflow, the riser having an outlet discharging into the container which is larger than the intake opening of said discharge pipe; a float disposed in the liquid before it overflows in the container and connected with the discharge pipe to govern the level of the intake opening of the discharge pipe; a treatment tank into which the container discharges; a chemical tank discharging into the treatment tank; mechanism for regulating the discharge of chemical from the chemical tank and governed by the liquid flowing through the discharge pipe; and a valve controlling the supply of liquid to the riser and also connected with the aforesaid float to be closed thereby upon excessive flow of liquid.

6. Liquid treating apparatus including a riser having outlets of different size; a container into which the larger outlet discharges and open at its upper portion to overflow, the larger outlet being below the limiting level of said container and the smaller outlet being at the discharge level of the container; a supply pipe for conveying liquid to be treated and discharging into the riser; a chamber within the riser and spaced apart therefrom, this chamber extending above and below the smaller outlet opening and in communication with the riser at its lower end; a treatment tank into which said container discharges; a chemical tank discharging into the treatment tank; and mechanism for regulating the discharge of chemical from the chemical tank and governed by the liquid flowing from the smaller outlet.

7. Liquid treating apparatus including a riser having outlets of different size; a container into which the larger outlet discharges and open at its upper portion to overflow, the larger outlet being below the limiting level of said container and the smaller outlet being at the discharge level of the container; a supply pipe for conveying liquid to be treated and discharging into the riser; a chamber within the riser and spaced apart therefrom, this chamber extending above and below the smaller outlet opening and in communication with the riser at its lower end; a treatment tank into which said container discharges; a chemical tank discharging into the treatment tank; mechanism for regulating the discharge of chemical from the chemical tank and governed by the liquid flowing from the smaller outlet; and a pipe for conveying a portion of the treated liquid to said chamber.

8. Liquid treating apparatus including a riser having outlets of different size; a container into which the larger outlet discharges and open at its upper portion to overflow, the larger outlet being below the limiting level of said container and the smaller outlet being at the discharge level of the container; a supply pipe for conveying liquid to be treated and discharging into the riser; a chamber within the riser and spaced apart therefrom, this chamber extending above and below the smaller outlet opening and in communication with the riser at its lower end; a treatment tank into which said container discharges; a chemical tank discharging into the treatment tank; mechanism for regulating the discharge of chemical from the chemical tank and governed by the liquid flowing from the smaller outlet; and means for heating the liquid.

9. Liquid treating apparatus including a riser having outlets of different size; a container into which the larger outlet discharges and open at its upper portion to overflow, the larger outlet being below the limiting level of said container and the smaller outlet being at the discharge level of the container; a supply pipe for conveying liquid to be treated and discharging into the riser; a chamber within the riser and spaced apart therefrom, this chamber extending above and below the smaller outlet opening and in communication with the riser at its lower end; a treatment tank into which said container discharges; a chemical tank discharging into the treatment tank; mechanism for regulating the discharge of chemical from the chemical tank and governed by the liquid flowing from the smaller outlet; a pipe for conveying a portion of the treated liquid to said chamber; and means for heating the liquid.

In witness whereof, I hereunto subscribe my name this fifth day of January A. D., 1923.

KENT W. BARTLETT.